United States Patent [19]

Creighton et al.

[11] Patent Number: 5,176,936
[45] Date of Patent: Jan. 5, 1993

[54] PUFFED HIGH FIBER R-T-E CEREAL AND METHOD OF PREPARATION

[75] Inventors: Dean W. Creighton, Albertville; John D. Efstathiou, Plymouth, both of Minn.

[73] Assignee: General Mills, Inc., Minneapolis, Minn.

[21] Appl. No.: 696,889

[22] Filed: May 8, 1991

Related U.S. Application Data

[63] Continuation-in-part of Ser. No. 628,760, Dec. 17, 1990, and a continuation-in-part of Ser. No. 628,980, Dec. 17, 1990.

[51] Int. Cl.⁵ .............................................. A23L 1/18
[52] U.S. Cl. ................................. 426/618; 426/448; 426/449; 426/559; 426/620; 426/621
[58] Field of Search .................... 426/618–620, 426/621, 559, 449, 448

[56] References Cited

U.S. PATENT DOCUMENTS

| D. 323,232 | 1/1992 | Duffy . | |
|---|---|---|---|
| 2,615,809 | 10/1952 | Jean . | |
| 3,054,677 | 9/1962 | Graham, Jr. et al. | 426/448 |
| 3,462,277 | 8/1969 | Reinhart | 426/448 |
| 3,554,763 | 1/1971 | Fast et al. . | |
| 3,656,965 | 4/1972 | Strommer et al. | 426/449 |
| 3,660,110 | 5/1972 | Holtz, Jr. et al. | 426/449 |
| 3,966,990 | 6/1976 | Cremer et al. | 426/559 |
| 4,348,379 | 9/1982 | Kowalsky et al. . | |
| 4,350,714 | 9/1982 | Duvall | 426/559 |
| 4,409,250 | 10/1983 | Van Hulle et al. | 426/559 |
| 4,497,840 | 2/1985 | Gould et al. . | |
| 4,568,557 | 2/1986 | Becker et al. . | |
| 4,759,942 | 7/1988 | Von Fulger | 426/449 |
| 4,777,045 | 10/1988 | Vanderveer et al. | 426/559 |
| 4,834,989 | 5/1989 | Bolles et al. . | |
| 4,844,937 | 7/1989 | Wilkinson et al. | 426/559 |
| 4,938,982 | 7/1990 | Howard | 426/559 |
| 5,024,996 | 6/1991 | Ringe . | |
| 5,026,689 | 6/1991 | Ringe et al. . | |
| 5,063,078 | 11/1991 | Foehse . | |
| 5,085,883 | 2/1992 | Garleb et al. . | |

OTHER PUBLICATIONS

Quaker TM Crunchy Corn Bran toasted high fiber corn cereal.
"Oatrim: Fat Reducer, cholesterol fighter," pp. 48–52, line 13, Food Processing, Aug., 1990.
"Total Dietary Fiber . . . Update '88" Medallion Laboratories Analytical Progress vol. 5, No. 2, Jun., 1988, pp. 1–8.
"Health Benefits Join Functional Attributes" Food Processing, Aug. 1989, pp. 19–42.

Primary Examiner—Jeanette Hunter
Assistant Examiner—Mary S. Mims
Attorney, Agent, or Firm—John A. O'Toole

[57] ABSTRACT

Disclosed are puffed ready-to-eat breakfast cereal products having a high Total Dietary Fiber content which nonetheless exhibit desirable crispness. The cereal products are characterized by specific densities of about 0.075 to 0.35 g/cc. The Total Dietary Fiber content of the cereal compositions is about 2.5–12 g/oz or about 9% to 42%. The total fat content of the puffed cereal is less than about 4%. The cereal base is in the form of a hollow, pillow shaped piece comprising a thin shell surrounding the hollow core. In preferred embodiments, the cereal is provided with a low level of a sugar presweetening coating. Also disclosed are processes for preparing the puffed high fiber R-T-E cereals from pellets in sheet form.

28 Claims, 1 Drawing Sheet

PUFFED HIGH FIBER R-T-E CEREAL AND METHOD OF PREPARATION

CROSS REFERENCE TO RELATED APPLICATION

This application is a continuation-in-part application to commonly assigned design patent applications U.S. Ser. No. 628,760 entitled "Food Product Piece" (two sided pattern) filed Dec. 17, 1990 and to design patent application U.S. Ser. No. 628,980 entitled "Food Product Piece" (one sided pattern) filed Dec. 17, 1990, each by Creighton and Efstathiou.

FIELD OF THE INVENTION

The present invention relates to food products and to their methods of preparation. More particularly, the present invention pertains to puffed R-T-E breakfast cereals of high Total Dietary Fiber content and to their methods of preparation.

BACKGROUND OF THE INVENTION

Ready-To-Eat ("R-T-E") cereals are popular food items and exist in large numbers of varieties. R-T-E cereals, especially those comprising whole grain, are known as good sources of fiber. A good description of the literature pertaining to the health discussion on the role of fiber is found in U.S. Pat. No. 4,777,045 (issued Oct. 11, 1988 to Vanderveer et al. and is entitled High Bran Snack) which is incorporated herein by reference. In view of the health interest in fiber, high fiber cereals are increasingly popular. These cereals typically contain added levels of insoluble fiber sources, especially corn and wheat bran, and range generally from about 2–5 g fiber/oz cereal. Some cereals are formulated from all bran sources and can contain up to 8–10g/oz fiber. High fiber cereals using purified insoluble fiber sources and artificial sweeteners can even contain as high as 8–13 g fiber/oz of cereal. Generally, high fiber cereals while containing high levels of insoluble fiber contain low levels of soluble fiber.

The food art has recently experienced great interest in dietary fiber which has resulted in rapid development in the understanding of fiber. "Total dietary fiber" is a relatively new term for what used to be known colloquially as bulk, roughage, bran, etc. and generally is a collective term embracing various fiber types. Broadly, however, total dietary fiber includes two categories of fiber; namely, insoluble dietary fiber ("IDF") and soluble dietary fiber ("SDF").

Increasing the insoluble fiber content of the diet has been suggested as being beneficial for such conditions as irregularity, colon cancer and even varicose veins. Recently, however, soluble fiber has enjoyed great attention due to the beneficial effects of increased consumption on lowering elevated cholesterol levels (antihypercholesterolemia) and thus hopefully on the incidence and severity of coronary heart disease and arteriosclerosis.

While popular and potentially beneficial to good nutrition, high fiber cereals are not without disadvantages. The primary concern is with the organoleptic qualities of the R-T-E cereal containing high levels of fiber. Generally, as the concentration of fiber increases, the starchy components necessarily decrease, adversely affecting the cereals' organoleptic and physical properties. High fiber cereals are often dry, exhibit very short bowl lives, yield highly frangible pieces and experience annoying compaction in interstitial areas of teeth ("teeth compaction"). Most importantly from a consumer preference standpoint, such high fiber content cereals lack the organoleptically essential property of crispness or crunchiness. R-T-E cereals fortified with soluble fiber are especially prone towards exhibiting undesirably soft and uncrisp properties.

The present invention is directed towards the provision of a high TDF fiber R-T-E cereal with superior organoleptic attributes or qualities, especially crispness and which is fortified with insoluble, or both insoluble and soluble dietary fiber. Surprisingly, the present invention provides such a superior quality high fiber R-T-E cereal which nonetheless contains a high concentration of TDF fiber. In view of the difficulties of formulating R-T-E cereals with high levels of insoluble fiber, the prior art includes many efforts at improving the qualities of insoluble fiber fortified R-T-E cereals.

Generally, previous high fiber R-T-E cereal products are unpuffed, typically in the form of flakes or shreds. See U.S. Pat. No. 4,497,840 (issued Feb. 5, 1985 to Gould et al.) entitled Cereal Foods Made From Oats and Method of Making. While unpuffed high IDF R-T-E cereal products are popular, it would be desirable to have a puffed and crisp high TDF R-T-E cereal. Of course, full oat flour puffed and crisp R-T-E cereals are well known and popular (e.g., Cheerios ® brand R-T-E cereal). Such R-T-E cereals contain certain native levels of oat bran and thus low (relative to the present invention) levels of TDF. However, it would be desirable then to substantially fortify the cereal composition to provide a high TDF crisp, puffed cereal. Unfortunately, such fiber fortification materially adversely affects the oat cereal compositions puffability. Indeed, a high oat bran cereal composition, if high in soluble fiber exhibits poor puffability. In short, it is difficult to formulate a high TDF R-T-E cereal of desirable crispness. It is also difficult to formulate a high TDF R-T-E cereal that is puffed. To formulate a high TDF R-T-E cereal which is both crisp and puffed is extremely difficult.

Other high density or unpuffed high fiber food products containing various fiber sources are well known. For example, U.S. Pat. No. 4,568,557, to Becker et al., discloses a snack food product prepared by pre-mixing a dietary fiber with a food grade oil; premixing a compound coating containing a fractionated fat, sweetener, milk solids, yogurt, and a flavoring agent; blending the two pre-mixtures and adding a cereal product and a dried fruit or nut; and extruding the resulting mixture into a desired shape. While useful, the product is undesirably high in fat and unpuffed.

European patent application No. 0068229, to Kleinert, discloses the addition of the seed coats (episperm) of cocoa beans in finely powdered form, to dough, bread, snacks, and chocolate to increase bulk and stimulate the intestinal tract.

U.S. Pat. No. 4,348,379, to Kowalsky, discloses a dietetic composition for natural digestion regulation containing whole fleawort seeds, whole linseed, wheat bran, lactose, a binding agent based on natural rubber, flavor and food color additives. The preferred binding agent is gum arabic.

Recently, improved R-T-E cereals that are fortified with soluble fiber having improved organoleptic attributes have been developed (see, for example, U.S. Ser. No. 330,245 entitled R-T-E Cereal With Psyllium, filed Mar. 29, 1989 by Ringe and U.S. Ser. No. 446,247 entitled R-T-E Cereal With Soluble Fiber. filed Dec. 5. 1989 by Ringe et al.). While these references disclose compositions of improved palatability, the taste of most products, especially R-T-E cereals, containing a sufficient amount of fiber to be efficacious continues to be a problem. Those products which are particularly rich in fiber generally employ a fat or oil to increase the palatability of the products to mask partially the dryness and/or grittiness of most fiber sources.

Thus, it is quite surprising that a high total dietary fiber organoleptically pleasing R-T-E cereal can be obtained which does not require high levels of a fat ingredient and which is both crispy and puffed. The present cereal products are essentially fabricated from a defined cooked cereal dough composition importantly defined in part by high levels of both insoluble and soluble fiber in a certain combination and formed into a puffed R-T-E cereal piece of a pillow shaped, hollow configuration.

SUMMARY OF THE INVENTION

Figure 2:
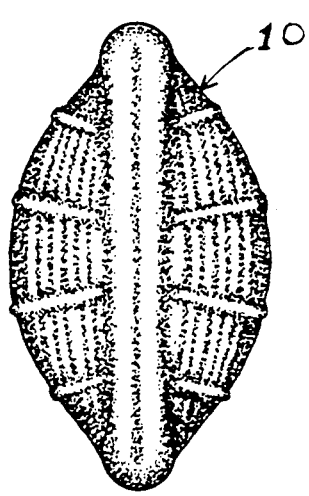
FIG. 2 is a side elevational view thereof, the opposite side being substantially a mirror image thereof.

In its product aspect, the present invention resides in R-T-E cereal pieces in the form of puffed, pillow shaped pieces. The pillows are defined in part by a continuous outer skin surrounding a hollow core. The skin thickness ranges from about 0.5 to 2 mm. Selection of this particular shaped piece importantly and surprisingly contributes to the organoleptically important attribute of crunchiness. The R-T-E pieces preferably include a topical sugar coating.

The present R-T-E cereal pieces are fabricated from cooked cereal dough compositions useful for the preparation of crispy and puffed R-T-E cereals or other cereal products which nonetheless have high levels of Total Dietary Fiber, to pellet/intermediate products and to the finished R-T-E puffed cereals themselves.

The cereal compositions have a total dietary fiber content of about 2.5 g/oz to 12 g/oz or about 9% to 42%. The balance of the cereal composition comprises conventional R-T-E cereal ingredients. The insoluble fiber to soluble fiber weight ratio is at least about 2:1. The total fat content of the cereal composition is less than about 4%. The finished R-T-E cereals are characterized by bulk densities of about 0.075 to 0.35 g/cc.

In another product aspect, the present invention resides in pellets or half products useful in the preparation of crispy and puffed R-T-E cereals or puffed fried snacks. The pellets have moisture contents ranging from about 8% to 14%. The pellets comprise pieces in thin sheet form. The sheet thickness ranges from about 1.0 to 2.0 mm (0.020 to 0.080 in) of cooked cereal dough. The present pellets are especially useful in the provision of R-T-E cereals.

In its method aspect, the present invention resides in methods for forming the cooked cereal doughs, pellets and R-T-E cereals. The present methods comprise the essential steps of A) forming an homogeneous mixture of selected dry cereal ingredients having a controlled ratio of insoluble to soluble fiber and controlled amounts of water, B) cooking the blend to form a cooked cereal dough, C) forming the dough into shaped pieces of defined thickness to form cereal pellets, D) drying the pellets, and E) puffing the pellets under defined conditions to form the present pillow shaped R-T-E cereals.

DETAILED DESCRIPTION OF THE INVENTION

In its product aspects, the present invention relates to a high total dietary fiber R-T-E cereal in the form of a hollow pillow shaped piece that is both crispy and puffed. In its method aspect, the present invention resides in methods for making the high fiber shaped R-T-E cereal piece. Each of the product composition and features as well as the steps of the present methods are described in detail below.

Throughout the specification and claims, percentages are by weight and temperatures in degrees Fahrenheit unless otherwise indicated.

A. Forming a Dry Cooked Cereal Dough

The first essential step of the present method of cereal product preparation comprises forming a cooked cereal dough containing controlled amounts and types of fiber, fat, and moisture content. The cooked cereal dough can comprise a wide variety of cereal ingredients conventionally used to prepare R-T-E cereals. The cereal ingredients are cooked in the presence of controlled amounts of moisture and formed into a cooked cereal dough in known manner. Conveniently, this step can involve the substeps of 1) forming a dry mixture of cereal ingredients and 2) working the cereal cooked ingredients with added heat and controlled moisture addition to form the dry cereal ingredients into a cooked cereal dough.

1. Forming a Dry Mixture of Cereal Ingredients

The cereal dry mix can comprise a wide variety of farinaceous materials including those derived from common cereal ingredients including corn, wheat, oats, rye, barley, rice, and mixtures thereof. Less common specialty grains, e.g., amaranth, triticale, buckwheat, can also be used. Useful herein are whole grains and/or derivative grain products. Such derivative grain products include size reduced whole grains such as cut grain pieces and flours. Also useful herein are a wide variety of cereal ingredients derived by extraction from whole cereal flours including, cereal flours (i.e., without the bran or germ fractions) and starches. Also useful herein are the bran and germ fractions. Preferred for use herein as the cereal ingredient is degermed corn flour, rice flour and mixtures thereof. Such materials are preferred since they give greater expansion than other flours or whole grain sources. Good results are obtained when the present cereal compositions comprise about 25 to 80% of the farinaceous material(s), preferably about 35 to 60%. For best results in terms of balancing the organoleptic attributes of the R-T-E cereal with desired levels of fiber, the farinaceous materials comprise about 30 to 55%.

The cereal dry mix can also comprise conventional levels of nutritive carbohydrate sweetening agents (e.g., sucrose, fructose, dextrose, corn syrup solids, malt syrups, honey, and mixtures thereof), salt and adjuvants. In preferred embodiments, the present compositions desirably comprise about 0.1 to 20% of the nutritive carbohydrate sweetening agent, preferably about 5 to 15%, and for best results about 9%.

Sucrose is the most highly preferred nutritive carbohydrate component. If present, sucrose can comprise from about 0.1% to 15% of the present cereal compositions and preferably between about 1% and 10%, and for best results about 3% to 7%. Sucrose not only provides sweetness but also favorably affects product texture and puff volume.

Importantly, in addition to the native fiber supplied or contributed by the farinaceous ingredients, the present dry mix additionally comprises sufficient amounts of supplemental concentrated sources of fiber such as to provide fiber levels to the cooked cereal dough specified herein. A wide variety of fiber source materials are known and can be used herein. A good description of commercially available fiber ingredients suitable for use herein is given in Food Processing, Aug., 1989, pages 19-42. The described fiber sources useful herein can include, for example, cellulose, microcrystalline cellulose, cocoa bran, corn bran, oat bran, oat fiber, apple pulp, pectin, psyllium, rice bran, sugar beet pulp, wheat bran, soybean fiber, hydrocolloids (e.g., gum arabic), pea, wheat fiber and mixtures thereof. Especially useful herein as the supplemental fiber source material are corn bran, oat fiber, rice bran, soy fiber, gum arabic and mixtures thereof.

Undesirable finished product grittiness is a function of fiber particle size. Also, high fiber particle size modestly adversely affects puffed volume. Thus, the fiber source preferably ranges in particle size from about 25 to 1000 microns. Better results in terms of mouth feel and good puffed volume are realized when the fiber ranges from 65 to 300 microns. For best results, the fiber particle size ranges from 60 to 200 microns.

The dry blend can further comprise a wide variety of adjuvant materials included to improve the organoleptic, visual, or nutritional properties of the finished R-T-E cereal. Useful materials include, for example, colors, flavors, minerals, vitamins, high potency sweeteners, preservatives, and mixtures thereof. If present, such adjuvant materials can comprise from about 0.01% to about 5% by weight of the present products.

The above ingredients are selected so as to formulate finished R-T-E cereal products essentially characterized as having a total dietary fiber content of about 9% to 42% (dry basis) i.e., about 2.5 to 12 g of fiber per ounce of cereal. Preferably, the TDF ranges from about 21% to 32% (about 6 to 9 g/oz). For best results in terms of a combination of desirable eating qualities, yet relatively high fiber, the TDF is about 24.7% to 28.2%. The present cereal products can vary widely in the concentrations of the insoluble and soluble fiber content. The present products can be prepared having practically all the TDF contributed by insoluble fiber or can comprise substantial fractions of soluble fiber in combination with the insoluble fiber fraction. Preferably, the insoluble fiber to soluble fiber ratio is at least about 2:1. More preferably, the insoluble to soluble ratio is about 3:1. Such preferred ratios of fiber type are important to providing high levels of fiber well balanced as to type while allowing the provision of a finished R-T-E cereal exhibiting the desirable eating qualities. For best results, the insoluble to soluble fiber ratio is about 4:1.

Desirably, the total fat content of the cereal composition is less than about 4%. High fat contents are generally undesirable due to the high caloric value imparted to the cereal by inclusion therein. Also, high fat levels can adversely affect the puffability of the present products. The present fat levels include the fat contributed by the oil component of any included germ fraction as well as emulsifier (e.g., as a pelletizing aid), oil soluble flavor carrier, and other incidental fatty components. Desirably, however, the present cereal compositions are formulated to have low fat contents since excessive fat levels in the cereal composition can adversely affect puff volume. Useful herein are cereal compositions having fat contents of less than about 5.1%. Such fat levels are those obtained when whole grain flour, i.e., including the high fat content germ fraction, or the germ fraction alone are employed herein. However, both the fiber and fat fractions adversely affect puffed volume. Therefore, preferred compositions include less than about 3.5% fat and for best results less than about 3%. These fat levels embrace the fat contribution of any added emulsifiers or other fat-like materials conventionally added to puffable cereal pellet compositions to aid in preparation.

Optionally, the cooked cereal dough can comprise about 0.1% to 8% of a dextrin, e.g., maltodextrin. The dextrin modestly tenderizes the finished product.

In a highly preferred embodiment, the present cereal compositions have total starch contents ranging from about 15% to 60%. The term "total starch content" refers to the combination of the naturally occurring starch present in the farinaceous materials which may be used in the dough formulation whether pure or associated with other flour and/or starchy ingredients. Thus, in highly preferred embodiments, the farinaceous material includes, and cooked cereal doughs additionally comprise, in addition to the cereal flour, a starch component. Suitable starch components include any pregelatinized, ungelatinized, modified starch component. Especially preferred for use herein are starches derived from common cereal grains such as wheat, corn, rice, oats, rye, barley and mixtures thereof. If present, such starch material or supplemental farinaceous ingredient can comprise from about 0.1 to 25%, preferably about 1% to 15%.

Another highly preferred optional component of the present cereal composition is common salt. If present, salt comprises from about 0.1% to 5% of the dough, preferably between 0.5% to 3%, and most preferably between 0.5% to 2.0%.

2. Cooking to Form a Cooked Cereal Dough

In the next essential step, the essential dry materials together with optional ingredients such as sugar and salt are next combined with controlled quantities of water and cooked and worked to form gelatinized or "cooked" cereal doughs. Such gelatinized doughs, of course, can be prepared in various well known manners. Either batch cooking or continuous cooking operation can be used. Different methods of cooking including heating at atmospheric pressure in an agitated kettle, heating at elevated pressure in a tumbling type mixture, and heating under high pressure in a continuous mixer extruder.

One preferred method herein of gelatinizing the starchy component of the dry mix is by cooking in an extruder under pressure whether single screw or double screw. Such a process is both continuous and flexible.

Additionally, the use of higher pressures attainable in the extruder allow the use of higher temperatures and also lower water levels than are possible with a batch type cooking operation. The use of lower water levels thus minimizes the amount of drying required in subsequent steps and is helpful in control of absorbed moisture. For example, using an extrusion type process at 100 to 200 psig at about 250° to 350° F., 10% to 50% water based on the total moisture is sufficient to gelatinize the dough. Frequently, extruder cookers are equipped with upstream conditioners for further cooking, e.g., flavor development, and such modified extruder cooking systems can be and preferably are used herein.

It is important to control closely the amount of added water. Due to the high level of fiber, the present cereal compositions tend to absorb high levels of water. Cooked cereal doughs resulting from excessive water addition can be difficult to process in subsequent operations due to the tackiness or stickiness of the dough and resistance to drying. The cooked cereal dough is characterized as having a moisture content of about 10% to about 50% by weight. Better results are obtained when the cooked cereal doughs have a final moisture content of 15% to 40%. The optimal moisture content upon completion of the cooking operation is a function of the fiber and grain used and generally ranges from about 20 to 30%.

In the preferred embodiment, the cooked cereal dough is prepared by extrusion cooking in a single or double screw cooker extruder. The cooked cereal dough exiting the extruder preferably contains about 16% to 30% moisture depending upon the type and kind of fiber(s) used. Typical operating conditions range as follows:

Exit temperature: 255° to 310° F.
Residence time: 5 to 20 minutes
Work input: 5 to 10 kw/lb The cooking step is continued at sufficiently high temperatures and pressures for such time so as to gelatinize the starch. Even longer cook steps can also be used, if desired, such as to promote cooked cereal flavor development.

B. Forming Extrudate Ropes

In the next essential step of the present methods of preparation, the cooked cereal dough is essentially extruded without significant puffing to form an extrudate rope(s) having a moisture content of about 16 to 30% by weight. Of course, a small moisture loss or blow-off occurs upon extrusion causing a small reduction in moisture content. Importantly, the extruder cooking and extrusion conditions are selected so as to minimize puffing upon forming the extrudate rope. Typically, the extrudate rope will have a temperature ranging from about 260° to 310° F. In preferred embodiments, the extrusion step is practiced so as to form extrudate ropes through die openings of 0.125-0.5 inch diameter, preferably about 0.25 to 0.375 inch.

C. Sheeting

Thereafter, the extrudate ropes immediately sheeted preferably while still warm (i.e., at about 120° to 212° F., preferably about 140° to 180° F.) are then sheeted to form a continuous single layer sheet. Conveniently, the extrudate cooked cereal dough ropes are fed into cooled sheeting rolls to form a single sheet layer. Importantly, the sheeted dough so formed has a thickness ranging from about 1.0 to 2.0 mm, preferably about 1.5 mm. Excessively thick sheets can result in finished products exhibiting a harder texture. Sheets too thin can result in finished products with broken or perforated shells. Optionally, the sheeting rolls can apply a surface corrugation to the rope to realize finished pieces having a textured surface to improve product crunchiness.

D. Cutting Into Pieces

Next, the present invention essentially involves the step of cutting the sheets, typically transversely, to form shaped (i.e., rectangular or square) individual pieces. In the preferred embodiment, the pieces are cut to form parallelogram shaped pieces. In the most preferred embodiment, rectangular pieces are formed measuring about 9.5 mm × 12.5 mm and weighing, after drying, about 0.20 to 0.75 g, preferably about 0.3 to 0.4 gram. The cutting step is conveniently practiced employing a rotating cutter to cut the ribbons across their width to provide individual pieces.

E. Pellet Drying

After such shaping, sizing, the cooked cereal dough pieces are adjusted (e.g., partially dried) to a suitable puffing moisture within the essential 8% to 14% total moisture content range, preferably about 9% to 11% to form the present puffable R-T-E pellets. Any method of conventional drying can be used to reduce the moisture content of the pellets. The drying operation can be accomplished using equipment such as a rotary bed, tray and bulk dryers to form the present dried dough pellets. Simple hot air convection drying with agitation to prevent pellet sticking is the preferred method of pellet drying.

The drying process must be controlled such that the moisture transfer to the atmosphere of the dryer from the pieces is rapid, i.e., to cause case hardening and the pellets are importantly characterized as being case hardened. Case hardening occurs when the moisture loss occurs only or disproportionately from the outer surface of the pellets while the inner portion of the pellets retains moisture. The total moisture of the pellets should be within an 8% to 14% range, so that the pellets will puff or expand properly during puffing. This desired puffing results from the dried material in the outer portions of the preformed pellets trapping the rapidly heated moisture in the interior of the pellet to the point where the pressure causes puffing of the pellet. If the air convection drying operation is carried out at about 70° to 200° F. (relative humidity at least 35%) the pellets will be dried within about one hour and the moisture distribution within the pellets will be proper.

The term "pellet" as referred to in the art is used herein to refer to highly preferred puffable piece embodiments of roughly flat square pieces about 1.2 cm square, generally weighing between about 0 3 and 0.4 grams having a thickness ranging from about 1.0 to 2.0 mm.

F. Pillow Puffing

In the present methods, the pellets having been adjusted to a desirable moisture content, are then "blister" puffed to form the present pillow shaped puffed cereal base. Preferably, the cereal pellets are puffed in a high velocity hot air dryer such as a jet zone dryer (a type of fluidized bed) using an air temperature of about 400° to 500° F. and while not critical, an air velocity of about 1-4 ft/sec. The puffed pieces so formed essentially involve an expansion of the flat sheet pellets to form an interior hollow cavity having a surrounding skin. The puffed pieces thus are in the form of pillow shaped puffed cereal base pieces having a hollow, generally spherical core. The puffing step further reduces the moisture content to less than about 2% to 4% by weight. It is critical to the present organoleptic attributes that the skin has a very thin skin ranging in thickness of only from about 0.5 to 2 mm. The core diameter ranges from about 6.3 to 13 mm.

The present puffed R-T-E cereal products are characterized by specific densities ranging from about 0.075 to 0.35, preferably about 0.1 to 0.12 g/cc. The puffed R-T-E cereal product can also be density characterized by bulk densities. In commercial practice, bulk densities are used to express the weight of the product when packaged in a conventional standard size carton, especially the small size, which conveniently is of a volume of about 125 cubic inches. The present puffed R-T-E products are essentially characterized by bulk densities ranging from about 150 to 300 grams per 125 cubic inch, preferably about 200 to 250 grams per 125 cubic inch. For best results, the products have bulk densities ranging from about 200 to 225 grams per 125 cubic inch.

The individual puffed cereal pieces desirably weigh about 0.1 to 0.4 g each, preferably about 0.25 to 0.35 g.

G. Sugar Coating

Thereafter, the pillow shaped puffed cereal base pieces then are essentially coated with a topical sugar coating in known manner. Known compositions are used to apply the presweetening coating. Generally, such sugar coating solutions comprise a sugar syrup comprising sucrose, corn syrup, and water but can additionally comprise a triglyceride, e.g., coconut oil, soybean oil, cottonseed oil. Good results are obtained, for example, when the sugar coating syrup comprises about 20 to 85% sucrose, about 5 to 30% corn syrup, about 15 to 35% water and optionally about 0.1 to 0.5% fatty triglyceride. In more preferred embodiments, the sugar coating solution additionally comprises a flavor constituent and optionally vitamins and colors. The addition of a flavor constituent and/or vitamins to the sugar coating solution is preferred due to flavor losses and/or vitamin heat instability that can occur from the cooking, drying of the dough, and puffing steps practiced herein. These steps, due to their heat application, tend to drive off the volatile flavor constituents leading to flavor degradation or loss as well as to vitamin breakdown. Sufficient amounts of the sugar coating solution are applied, e.g., by enrobing, such that upon subsequent drying the cereal has a presweetener-coating of about 5 g to 25 g sweetener coating solids per 100 g of puffed high fiber cereal base, i.e., a weight ratio of sugar coating to cereal base, preferably about 5 to 10 g.

The sweetener coating greatly improves the desired crispness attributes of the present puffed high TDF R-T-E cereal products as well as, of course, imparting a desirable sweet taste.

The sugar coating step can be practiced in known manner using familiar enrobing and drying equipment and techniques. Typically, the sugar coating is applied by forming an aqueous sugar syrup and enrobing the syrup onto the cereal base and drying to remove the added moisture, either concomitantly or subsequently to enrobing. The drying is continued until finished product moisture contents of 2% to 6%, preferably <4% are obtained.

The preferred, sugar coated pieces have a bulk density of about 0.1 to 0.40 g/cc.

The presweetened puffed high fiber R-T-E cereal products so prepared can be conventionally packaged and distributed. Upon consumption, the present high fiber puffed R-T-E cereals are delightfully crunchy yet nonetheless provide high levels of fiber.

The high fiber content ready-to-eat breakfast cereal produced according to this invention will have a TDF or crude fiber content of approximately 9% to 42% and preferably from 21% to 32%, about 2.5 to 12 g/oz, preferably about 6 to 9 g/oz. The weight ratio of insoluble to soluble fiber essentially ranges from about 2 to 4:1, preferably about 1 to 2:1.

Several recognized analytical methods are known which, unfortunately, when applied to individual fiber materials can give widely varying values to the relative contribution of soluble vs. insoluble fiber and even, although with lesser variability, to total dietary fiber. For use herein, the fiber testing methods and characterizations are those described in "Determination of Insoluble, Soluble, and Total Dietary Fiber in Foods and Food Products: Interlaboratory Study" by Leon Prosky et al., J. Assoc. Off. Anal. Chem. (Vol. 71, No. 5, 1988).

Those skilled in the art will appreciate that the term dietary fiber is an indefinite one which has several meanings depending upon the method of assay among other variables. To remove this uncertainty the definition of NDR or dietary fiber in this application will be as defined by the method of Goering and Van Soest (Agricultural Handbook No. 379, A.R.S. USDA Washington, DC 1970) as modified and discussed by Robertson (Chapter 1). The detergent system of fiber analysis in (Topics in Dietary Fiber Research edited by G. G. A. Spiller and R. J. Amen, Plenum Press New York 1978) can also be used.

Figure 1:
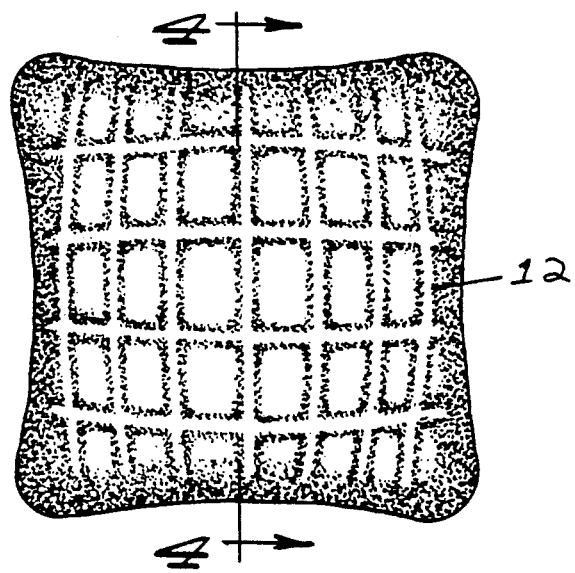
FIG. 1 is a top plan view of an embodiment of a FOOD PRODUCT PIECE illustrating our new design, the opposite side being substantially a mirror image thereof.
Figure 3:
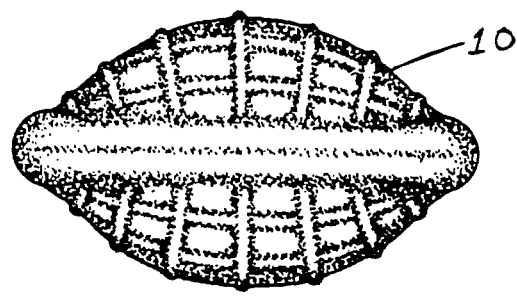
FIG. 3 is a bottom elevational view thereof, the opposite top side being substantially a mirror image thereof.
Figure 4:
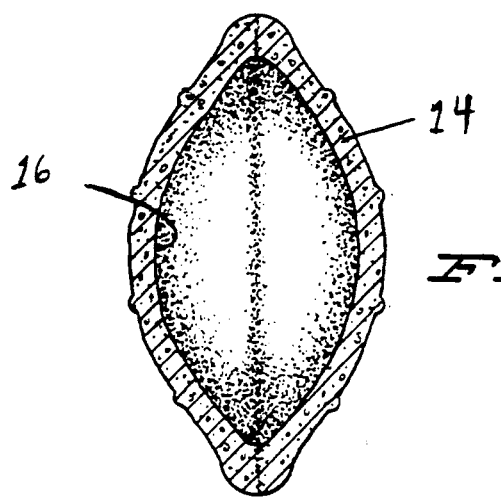
FIG. 4 is a cross sectional view thereof showing a hollow cavity.

Now referring to the drawings and specifically to FIGS. 1–3, there is shown an R-T-E cereal piece of the present invention generally designated by reference numeral 10. The R-T-E piece 10 there depicted is a puffed square or pillow shape. The R-T-E piece 10 is further seen optionally to include a visually and ornamentally distinctive surface texture feature 12 such as the corrugations or grid pattern depicted. Now referring generally to FIG. 4, it can be seen that the piece 10 comprises a seamless exterior shell in the form of a very thin but imperforate skin 14 surrounding a hollow cover 16.

The high TDF R-T-E cereal products so prepared are both crispy and puffed. Additionally, the product exhibits excellent bowl life properties. Moreover, the R-T-E cereals exhibit low levels of teeth compaction. The fat levels are low, typically <5%, and <4% when oil is not added to the sugar coating syrup. The finished R-T-E cereals can be conventionally packaged and distributed.

INDUSTRIAL APPLICATION

The present invention finds particular suitability in the commercial preparation of R-T-E breakfast cereals. The present invention provides puffed, R-T-E cereals of desirable crunch and crispness notwithstanding the high levels of total dietary fiber.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the R-T-E cereal art, can be undertaken without departing from the spirit and scope of the invention.

EXAMPLE 1

A crisp, crunchy, pillow shaped, puffed, high fiber R-T-E cereal product of the present invention is prepared as follows:

A dry blend of the following ingredients was prepared:

| Ingredient | Weight % |
| --- | --- |
| Corn flour | 18.9 |
| Rice flour | 18.9 |
| Corn bran | 34.0 |
| Wheat starch | 7.8 |
| Salt | 2.0 |
| Sugar | 15.5 |
| Malt syrup | 2.9 |
| | 100.0% |

The dry mix was processed through a single cooker extruder, and processsed as follows:

About 2,000 lb (910 kg) of the dry blend ingredients were blended for 15 minutes in a conventional ribbon blender equipped with a wet blend/dry blend bladed mixer. The ingredients mixture was then fed to a low pressure single screw cooker extruder equipped with a precooker conditioner with sufficient water to completely cook the mixture to a moisture content of about 35%. The residence time in the conditioner was about 30 min. The conditioner operating pressure was ambient pressure. The cooked cereal base was then extruded as several ropes of dough.

The cooked cereal dough was then extruded in the form of several unpuffed extrudate dough ropes having a temperature of about 295° F., a moisture content of 20%, and a diamater of about 0.3 inch.

The extrudate ropes were then fed to a sheeting roll to form dough ribbons having a thickness of about 1.5 mm. Immediately thereafter, the ribbons were sectioned with a reciprocating cutter to form individual rectangular pieces measuring about 0.6 × 1.2 cm in size.

Next, the pieces were dried in a forced hot air dryer operating at a temperature of 185° F. and a relative humidity of about 40%. The pieces were dried for about 60 minutes to a moisture content of 10% to form case hardened dried pieces.

The pieces were then puffed in a fluidized bed hot air dryer operating at a temperature of 410° F., air velocity of 2.0 ft/sec. The pellets were puffed to form an R-T-E cereal base in the form of pillow shaped hollow pieces. The pieces had a hollow core and a skin thickness of about 1.5 mm, and a bulk density of 0.15 g/cc.

Thereafter, the pillow shaped puffed cereal base pieces had applied thereto a topical sugar coating as follows:

A sugar coating/slurry composition was made separately having the following formulation:

| Ingredient | Weight % |
| --- | --- |
| Sugar | 60 |
| Water | 20 |
| Vanilla flavor | 5 |

| Ingredient | Weight % |
| --- | --- |
| Corn syrup | 14 |
| Salt | 1 |
| | 100% |

The cereal base and sugar slurry were charged to an enrober in a weight ratio of 4:1 cereal base to coating (dry basis) and tumbled until evenly coated. Thereafter, the enrobed cereal pieces were dried with forced hot air to a final product moisture content of about 4%.

The finished presweetened high fiber R-T-E cereal had a fiber content of about 24.75%. The insoluble to soluble fiber ratio was about 6:1. The fat content was about 3.5%.

EXAMPLE 2

A crisp, crunchy, pillow shaped puffed, high fiber R-T-E cereal product of the present invention is prepared as follows:

A dry blend of the following ingredients was prepared:

| Ingredient | Weight % |
| --- | --- |
| Rice bran | 45.0 |
| Rice flour | 14.5 |
| Corn flour | 14.5 |
| Pregelled starch | 10.0 |
| Salt | 0.9 |
| Sugar | 12.5 |
| Malt syrup | 2.5 |
| NaHCO$_3$ | 0.1 |
| | 100.0% |

The above formulation was processed to form finished, puffed cereal base pieces as Example 1. Total dietary fiber is 3.0 g/oz.

Thereafter, a sugar coating composition was separately prepared having the following formulation:

| Ingredient | Weight % |
| --- | --- |
| Sugar | 51.0 |
| Water | 36.2 |
| Honey | 12.0 |
| Salt | 0.8 |
| | 100.0% |

The sugar coating was applied in a weight ratio (dry basis) of 6:1. The enrobed pieces were then dried to a moisture content of 2.5% to form the final product.

A crisp, crunchy, pillow shaped, puffed, high fiber R-T-E cereal product resulted. The insoluble to soluble fiber ratio was about 6:1. The fat content was less than about 4%. The exterior shell had a thickness of about 1.0 mm. Final product has a crunchy texture, and a sweet, nutty flavor. Final TDF was 2.65 g/oz. Sugar content was 7.0 g/oz. The bulk density was about 0.17 g/cc.

EXAMPLE 3

A crisp, crunchy, pillow shaped, puffed, high fiber R-T-E cereal product of the present invention is prepared as follows:

| Ingredient | Weight % |
| --- | --- |
| Corn flour | 14.8 |
| Soy fiber | 42.3 |
| Rice flour | 14.8 |
| Wheat starch | 7.8 |
| Salt | 1.9 |
| Sugar | 15.5 |
| Malt syrup | 2.9 |
| | 100.0% |

The R-T-E cereal product was prepared essentially as described in Example 1.

Product had a TDF of 10.3g/oz, with a very crunchy texture with extremely long bowl life.

A crisp, crunchy, pillow shaped, puffed, high fiber R-T-E cereal product resulted. The insoluble to soluble fiber ratio was about 4:1. The fat content was less than about 4%. The exterior shell had a thickness of about 1.0 inch. The bulk density was about 0.15 g/cc.

What is claimed is:

1. A high fiber puffed R-T-E cereal exhibiting improved organoleptic properties comprising:
   a cereal base in the form of a hollow pillow having an exterior shell and a hollow core,
   wherein the shell has a layer thickness ranging from about 0.5 to 2 mm,
   wherein the cereal base is fabricated from a cooked cereal dough composition comprising:
     about 2.5 to 12 g/oz total dietary fiber and the balance R-T-E cereal ingredients,
   wherein the cereal base has a topical presweetener coating in a weight ratio of cereal base to presweetener coating to about 1-20:1,
   wherein the total fat content is less than about 4%,
   wherein the bulk density of the R-T-E cereal ranges from about 0.075 to 0.35 g/cc, and
   wherein the total dietary fiber comprises an insoluble dietary fiber portion and a soluble dietary fiber portion in a weight ratio of about 2:1 to 4:1.

2. The R-T-E cereal of claim 1 wherein the cooked cereal dough comprises:
   A. about 25 to 80 wt % of a first farinaceous material (dry weight basis),
   B. about 0.1 to 20 wt % of a nutritive carbohydrate sweetening agent,
   C. sufficient amounts of a fiber source material having a particle size ranging from about 25 to 1000 microns, so as to provide a total dietary fiber content of about 2.5 to 12 g/oz,
   D. about 0.1 to 5 wt % salt, and
   E. a moisture content of less than about 4 wt %, and
   wherein the shell has an imperforate exterior surface.

3. The R-T-E cereal of claim 2 wherein the fiber source material is selected from the group consisting of cellulose, microcrystalline cellulose, cocoa bran, corn bran, oat bran, oat fiber, apple pulp, pectin, psyllium, rice bran, sugar beet pulp, wheat bran, soybean fiber, hydrocolloids, pea fiber, wheat fiber and mixtures thereof.

4. The R-T-E cereal of claim 3 wherein the pieces weigh from about 0.1 to 0.4 g, and wherein the farinaceous material comprises:
   1. a cereal flour.

5. The R-T-E cereal of claim 4 wherein the shell has a thickness of about 1 to 1.5 mm, wherein the weight ratio of cereal base to sweetener coating is about 3 to 10:1, and wherein the bulk density ranges from about 0.10 to 0.4 g/cc.

6. The R-T-E cereal of claim 5 wherein the cooked cereal dough comprises:
   A. about 25 to 80 wt % of the farinaceous material and wherein the farinaceous material comprises:
     a) a cereal flour
     b) a cereal starch
   B. about 0.1 to 20 wt % of the nutritive carbohydrate sweetening agent,
   C. about 10 to 50 wt % of the fiber source,
   D. about 0.1 to 5 wt % salt.

7. The R-T-E cereal of claim 6 wherein the cereal flour includes corn flour, rice flour, wheat flour, oat flour, barley flour and mixtures thereof.

8. The R-T-E cereal of claim 7 wherein the farinaceous material includes a whole grain flour.

9. The R-T-E cereal of claim 7 wherein the shell exterior surface is continuous and non-porous.

10. The R-T-E cereal of claim 9 wherein the shell has a textured exterior surface.

11. The R-T-E cereal of claim 9 wherein the shell is seamless and at least a portion of which includes corrugations.

12. The R-T-E cereal of claim 11 wherein the shell has a portion having a textured exterior surface including a first series of corrugations and a second series of corrugations at an angle to the first series to form a grid pattern.

13. A method for preparing a high fiber puffed R-T-E cereal, comprising the steps of:
   A. forming a cooked cereal dough comprising
     1. about 25 to 80% of a farinaceous material by weight of the dough (dry basis),
     2. about 0.1% to 20% of a nutritive carbohydrate sweetening agent,
     3. sufficient amounts of a supplemental fiber material to provide the dough with a total dietary fiber content ranging from about 2.5 to 12 g/oz (dry basis) including a soluble dietary fiber fraction and an insoluble dietary fiber fraction in a weight ratio ranging from about 1:2 to 4,
     4. a moisture content of about 15% to 35%;
   B. extruding the cooked cereal dough into extrudate ropes;
   C. sheeting the ropes into continuous sheets having a thickness ranging from about 1.0 to 2.0 mm;
   D. cutting the sheets to form shaped individual pieces;
   E. drying the pieces sufficiently rapidly to form dried case hardened pieces having a moisture content ranging from about 8% to 14%;
   F. heating the dried pieces to expand the pieces and to form a cereal base comprising puffed pillow shaped pieces having a skin enclosing a hollow interior, said skin having a thickness ranging from about 0.5 to 2 mm and having a bulk density ranging from about 0.075 to 0.35 g/cc (1.2 to 5.7 g/cu inch); and
   G. applying a topical sugar coating to the cereal base to form a crunchy and puffed high TDF R-T-E cereal.

14. The method of claim 13 wherein the cooked cereal dough comprises

A. about 25 to 80 wt % of a first farinaceous material (dry weight basis),
B. about 0.1 to 20 wt % of a nutritive carbohydrate sweetening agent,
C. sufficient amounts of a fiber source material having a particle size ranging from about 25 to 1000 microns, so as to provide a total dietary fiber content of about 6 to 9 g/oz,
D. about 0.1 to 3 wt % salt, and
E. a moisture content of less than about 4 wt %.

15. The method of claim 13 wherein the fiber source material is selected from the group consisting of cellulose, microcrystalline cellulose, cocoa bran, corn bran, oat bran, oat fiber, apple pulp, pectin, psyllium, rice bran, sugar beet pulp, wheat bran, soybean fiber, hydrocolloids, pea fiber, wheat fiber and mixtures thereof.

16. The method of claim 15 wherein the cooked cereal dough has a moisture content of about 18 to 24%.

17. The method of claim 16 wherein the puffing step is practiced using a fluidized bed dryer.

18. The method of claim 17 wherein the fluidized bed dryer has a temperature of about 400° to 500° F., an air velocity of about 0.5 to 4 ft/sec.

19. The method of claim 18 wherein the skin has a thickness ranging from about 1 to 1.5 mm.

20. The method of claim 19 wherein the pieces are parallelogram in shape and each weigh about 0.2 to 0.5 g.

21. The method of claim 20 wherein the weight ratio of sugar coating to cereal base is about 10 to 25:1.

22. The method of claim 21 wherein the cooked cereal dough additionally comprises a second farinaceous material, said second farinaceous material being a cereal starch, and wherein the first farinaceous material is a cereal flour.

23. A pellet useful for puffing to form a puffed, high fiber R-T-E cereal, comprising:
a cooked farinaceous dough in the form of a planar parallelogram having a thickness of about 0.5 to 2 mm and a weight ranging from about 0.2 to 0.5 g, said dough comprising:
A. about 25 to 80 wt % of a first farinaceous material (dry weight basis),
B. about 0.1 to 20 wt % of a nutritive carbohydrate sweetening agent,
C. sufficient amounts of a fiber source material having a particle size ranging from about 25 to 1000 microns, so as to provide a total dietary fiber content of about 6 to 9 g/oz,
D. about 0.1 to 3 wt % salt, and
E. a moisture content of less than about 4 wt %.
said pellet having a case hardened surface.

24. The pellet of claim 23 wherein the fiber source has an insoluble fiber content to soluble fiber content ranging from about 2:1 to 4:1.

25. The pellet of claim 24 wherein the cereal composition comprises:
A. about 25 to 80 wt % of a first farinaceous material (dry weight basis),
B. about 0.1 to 20 wt % of a nutritive carbohydrate sweetening agent,
C. sufficient amounts of a fiber source material having a particle size ranging from about 25 to 1000 microns, so as to provide a total dietary fiber content of about 2.5 to 12 g/oz,
D. about 0.1 to 5 wt % salt, and
E. a moisture content of less than about 4 wt %.

26. The pellet of claim 25 wherein the fiber source material is selected from the group consisting of cellulose, microcrystalline cellulose, cocoa bran, corn bran, oat bran, oat fiber, apple pulp, pectin, psyllium, rice bran, sugar beet pulp, wheat bran, soybean fiber, hydrocolloids, pea fiber, wheat fiber and mixtures thereof.

27. The pellet of claim 26 wherein the pieces weigh from about 0.1 to 0.4 g, and wherein the farinaceous material comprises:
1. a cereal flour
wherein the cooked cereal dough comprises:
A. about 25 to 80 wt % of the farinaceous material and wherein the farinaceous material comprises:
1) a cereal flour,
2) a cereal starch,
B. about 0.1 to 20 wt % of the nutritive carbohydrate sweetening agent,
C. about 10 to 50 wt % of the fiber source, and
D. about 0.1 to 5 wt % salt.

28. The pellet of claim 27 wherein a portion has a textured exterior surface including a first series of corrugations and a second series of corrugations at an angle to the first series to form a grid pattern.

* * * * *